United States Patent [19]
Predöhl et al.

[11] Patent Number: 4,695,236
[45] Date of Patent: Sep. 22, 1987

[54] APPARATUS FOR CONTINUOUS EXTRUSION OF A MULTILAYER SYNTHETIC RESIN WEB

[75] Inventors: Wilhelm Predöhl, Hennef-Bröl; Heinz Beisemann, Cologne; Paul Reitemeyer, Troisdorf, all of Fed. Rep. of Germany

[73] Assignee: Reifenhauser GmbH & Co. Maschinenfabrik, Troisdorf, Fed. Rep. of Germany

[21] Appl. No.: 701,579

[22] Filed: Feb. 14, 1985

[30] Foreign Application Priority Data

Feb. 15, 1984 [DE] Fed. Rep. of Germany ....... 3405257

[51] Int. Cl.$^4$ ...................... B29C 47/04; B29C 47/92
[52] U.S. Cl. ................................ 425/131.1; 264/171; 425/133.5; 425/376 A; 425/466
[58] Field of Search ................ 425/131.1, 133.5, 141, 425/376 A, 145, 146, 466; 264/71, 176 R, 171

[56] References Cited

U.S. PATENT DOCUMENTS 3,218,971 11/1965 Rowland .......................... 425/131.1
3,464,087 9/1969 Koch ................................ 425/131
4,197,069 4/1980 Cloeren ........................... 425/131.1
4,379,806 4/1983 Korpman ........................ 264/176 R
4,472,129 9/1984 Siard ................................ 425/381

FOREIGN PATENT DOCUMENTS 1504190 2/1977 Fed. Rep. of Germany .
60853 5/1977 Japan ............................. 264/176 R Primary Examiner—Jay H. Woo
Assistant Examiner—Timothy W. Heitbrink
Attorney, Agent, or Firm—Karl F. Ross; Herbert Dubno

[57] ABSTRACT

The apparatus for continuous extrusion of a plastic laminate has at least two extrusion screw presses, an accumulator block, a transition unit, and an output die, from which the plastic laminate product is extruded. The accumulator block has a combining channel or canal therein which is fed by the extrusion screw presses. This combining canal is connected by way of the transition unit to the output die. The combining canal preferably has a rectangular cross section with rounded corners and at its upstream end is directly connected to a first extrusion screw press by way of a connecting canal coaxial with the combining canal. Downstreamwards below the connecting canal is found at least one input metering slot connected to the combining canal at one end and through a connecting apparatus at its other end to an additional extrusion screw press, this input metering slot lying between an input plate and an adjusting bar guided in an adjusting bar recess. The input metering slot extends over a rectangular side of the rectangular cross section combining canal, is directed slantingly downstreamwards, and opens into the combining canal. The adjusting bar has an adjustable beveled portion fitting into the combining canal and is adjustable perpendicular to the input metering slot in the adjusting bar recess so as to meter the flow of thermoplastic material from the additional extrusion screw press.

8 Claims, 7 Drawing Figures

4,695,236

APPARATUS FOR CONTINUOUS EXTRUSION OF A MULTILAYER SYNTHETIC RESIN WEB

FIELD OF THE INVENTION

Our present invention relates to an apparatus for the continuous extrusion of a multilayer synthetic resin web and, more particularly, to an apparatus for continuous extrusion of a plastic foil, sheet, plate or the like, generally referred to herein as a web or as a plastic laminate, the term multilayer referring generally to two bonded layers although the structure can be duplicated for the coextrusion of a greater number of layers.

BACKGROUND OF THE INVENTION

An extrusion apparatus for the production of multilayer synthetic resin webs can have at least two extrusion screw presses, an accumulator or combining block at which two or more streams meet, a transforming unit, and a wide or broad slit output die, from which laminated plastic strand or web emerges, the combining block has a combining channel, to which the extrusion screw presses are connected and which is connected by way of the transforming or transition apparatus to the broad-slit output die.

The definition of the combining block makes it clear that in this unit several thermoplastic layers flow together and in the combining channel are bonded as it were so as to form a multilayered or laminate but unitary flow.

The structure of the extrusion apparatus is such that the many layers of the thermoplastic foil will not mix on the way to the output die.

Further in the transition unit the transformation of the multilayered thermoplastic flow into the wide but thin thermoplastic stream occurs which emerges from the die and hardens to form the foil, sheet or plate defined as the web.

In the extrusion apparatus according to German Pat. No. DE-AS 15 04 190, the combining channel is positioned between two input channels and is connected to a tapered output die or broadslit nozzle, which extends over the length of the combining channel and, as it were, forms an inlet for the transition unit, to which the previously mentioned output die is connected.

Two flow channels are perpendicular to each other.

This is useful for fabrication, but is not free from disadvantages, since the layer thickness of the plastic layers can not be controlled without further devices.

Particularly an adjusting element is missing for the thermoplastic flow or each thermoplastic partial flow. Such an adjusting element is however important, if a plastic web is to be manufactured in which thickness of a given layer must be set and controlled and/or the layers over the entire breadth of the plastic strip must have a uniform thickness to a given small tolerance.

OBJECTS OF THE INVENTION

It is the general object of our invention to provide an improved extrusion apparatus from which a separate tapered die parallel to the combining channel and feeding the transition unit can be eliminated and moreover the thermoplastic flow or each partial flow for an individual layer is adjustable and adjustable in a controlled way so that the layer thickness can be controlled within certain given exacting tolerances.

It is therefore an object of this invention to provide an improved apparatus for continuous extrusion of a thermoplastic laminate whereby the disadvantages of the prior art devices previously described are obviated.

It is a further object of this invention to provide a comparatively simple improved extrusion apparatus for a plastic laminate in which the layer thicknesses are accurately controlled.

It is yet another object of this invention to provide an improved extrusion apparatus of a simpler structure than the prior art, in which a tapered output die parallel to the combining channel is not required, and in which the thickness of the individual layers of the output plastic laminate are exactly and precisely controlled to within certain given exacting tolerances.

SUMMARY OF THE INVENTION

These objects and others which will become more apparent hereinafter are attained in accordance with our invention in an apparatus for the continuous extrusion of a multilayer synthetic resin (thermoplastic) web comprising at least two extrusion screw presses, a combining unit or block, a transition or spreading unit, and a broad-slit nozzle or output die, from which the web emerges, wherein the accumulator block has a connecting channel to which the extrusion screw presses are connected and which is connected to the tapered output die by way of the transition unit.

According to the invention the combining channel has an essentially rectangular channel cross section with rounded corners, and at one end is connected to a coaxial connecting canal communicating with a first extrusion screw press and the other end of the combining channel is connected with the transition unit, the combining channel having downstream of the connecting canal at least one input metering slot connected to the combining channel at one end and through connecting means at its other end to an additional extrusion screw press, this input metering slot lying between an input tongue projecting in the flow direction and an adjusting bar guided in an adjusting bar recess and juxtaposed with the tongue.

This input metering slot extends along one long rectangle side of the rectangular cross section combining channel, is directed slantingly downstreamwards toward this channel, and opens into the combining channel.

The adjusting bar has a compensating beveled portion fitting into the combining channel and is adjustable perpendicular to the input metering slot in the adjusting bar recess so as to meter the flow of thermoplastic material from the additional extrusion screw press into the combining channel. The term "compensating" is here used to signify the fact that the shape of this bevel is such as to achieve the desired degree of thickness variation in the combined flow of the layer supplied thereover to maintain, either uniformity to close tolerances or any desired thickness variation across the web.

It is understood that the combining channel is constructed so that the sum of the mass flows, which are injected from the different extrusion screw presses, can be properly unified into a common stream. The adjusting beveled portion of the adjusting bar can be inserted to various degrees into the combining channel, in order to achieve selected reproducible and uniform thicknesses for all layers to the most exacting given tolerances.

For example, the compensating beveled portion of the adjusting bar in a best-mode embodiment reaches into one rectangular side of the combining channel and in the vicinity of the center of the channel projects further than at the edge of the channel, to hold uniformity of cross section to that of a millimeter.

In any case in this way by adjustment of the adjusting bar, the layer thickness of the inflowing plastic layer can be controlled and indeed it can be guaranteed that the layer thicknesses are equal over the entire laminate. This is particularly true for a preferred embodiment wherein the adjusting bar for the input metering slot can have a convex, concave, or sinusoidal profile.

Within the scope of this invention various forms and structures are possible. In a particularly advantageous embodiment of the invention the input slot extends over an entire long rectangular side of the combining channel and opens into it. The adjusting bar can be precisely adjusted with the aid of one or more fine-adjustment screws.

It should also be understood that the adjusting bar is inserted into the adjusting bar recess with a very exact fit and that it is also very precisely adjustable. Nevertheless the adjusting bar is provided with a sealing groove, in which sealing elements are inserted bearing against the wall of the adjusting bar recess.

In an apparatus of the invention, in which different plastic materials with more than two plastic layers are made, a plurality of adjusting bars are provided, which for example, have different beveled portions. The optimum shape of the adjusting bar and the beveled portion for an individual plastic product is attained empirically.

It should be also be understood that for manufacture of a plastic laminate care must be taken that the thermoplastic material which flows in the combining channel has a uniform temperature throughout. Moreover the extrusion screw presses and the input apparatus or the connecting apparatus should be correspondingly constructed and moreover the parts of the apparatus, particularly the combining block, is correspondingly heated and isolated.

BRIEF DESCRIPTION OF THE DRAWING

The above and other objects, features and advantages of this invention will become more readily apparent from the following description, reference being made to the accompanying drawing in which.

SPECIFIC DESCRIPTION

Figure 1:
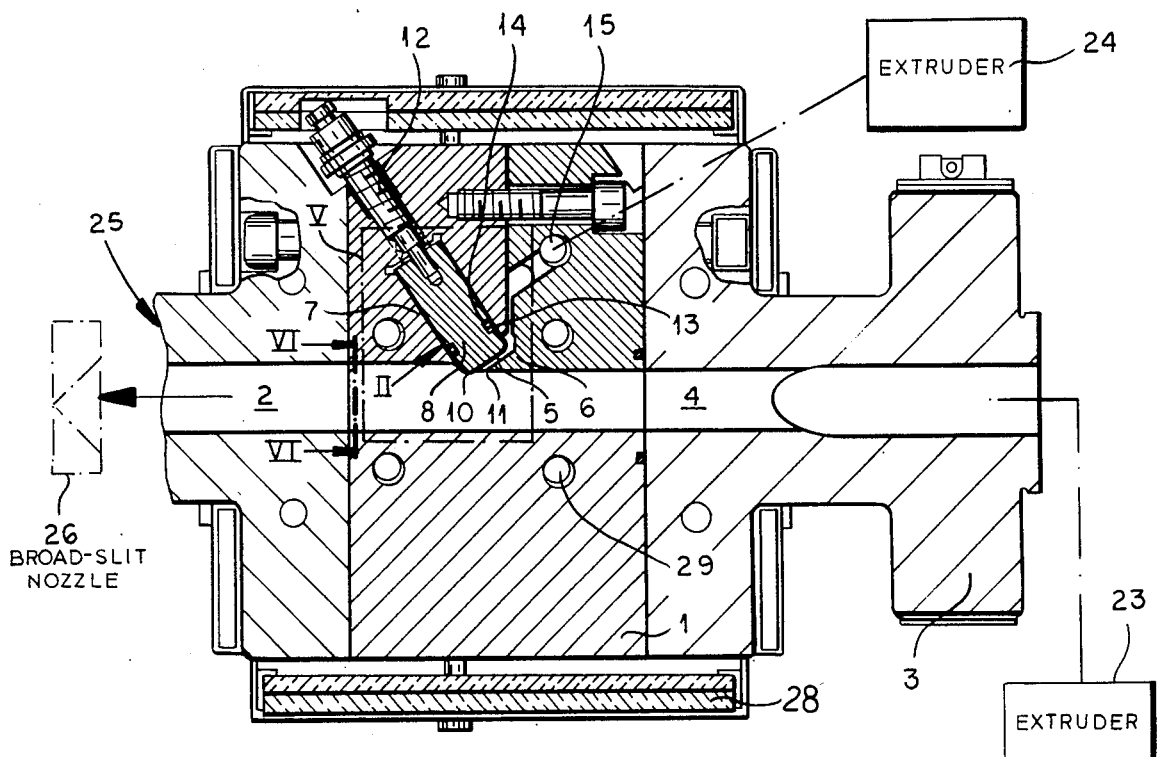
FIG. 1 is an axial cross sectional view through the combining block of an apparatus for extruding a multilayer web of thermoplastic synthetic resin according to the invention.

The apparatus shown in the drawing is used for continuous extrusion of a multilayer web 20 having two layers 21, 22 of thermoplastic synthetic resin bonded together with the aid of two extrusion screw presses 23, 24. An accumulator block 1, is bolted to a transition unit 25 connected to a wide or broad-slit nozzle or tapered output die 26, from which the laminated plastic web 20 is extruded.

The accumulator block 1 has a combining channel 2, to which an extrusion screw press 23 is connected by a flange assembly 3 provided with a connecting canal 4.

Figure 6:
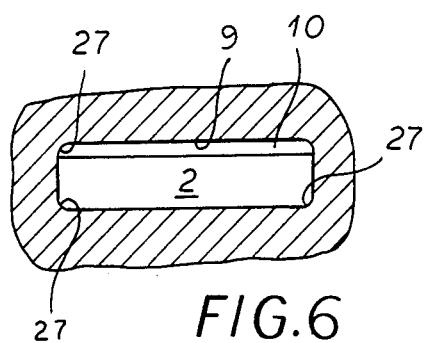
FIG. 6 is a section taken along the line VI—VI of FIG. 1.
Figure 7:
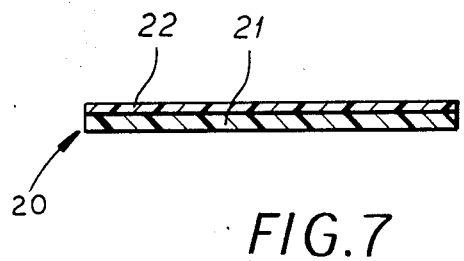
FIG. 7 is a section through a web produced by the apparatus of our invention.
Figure 5:
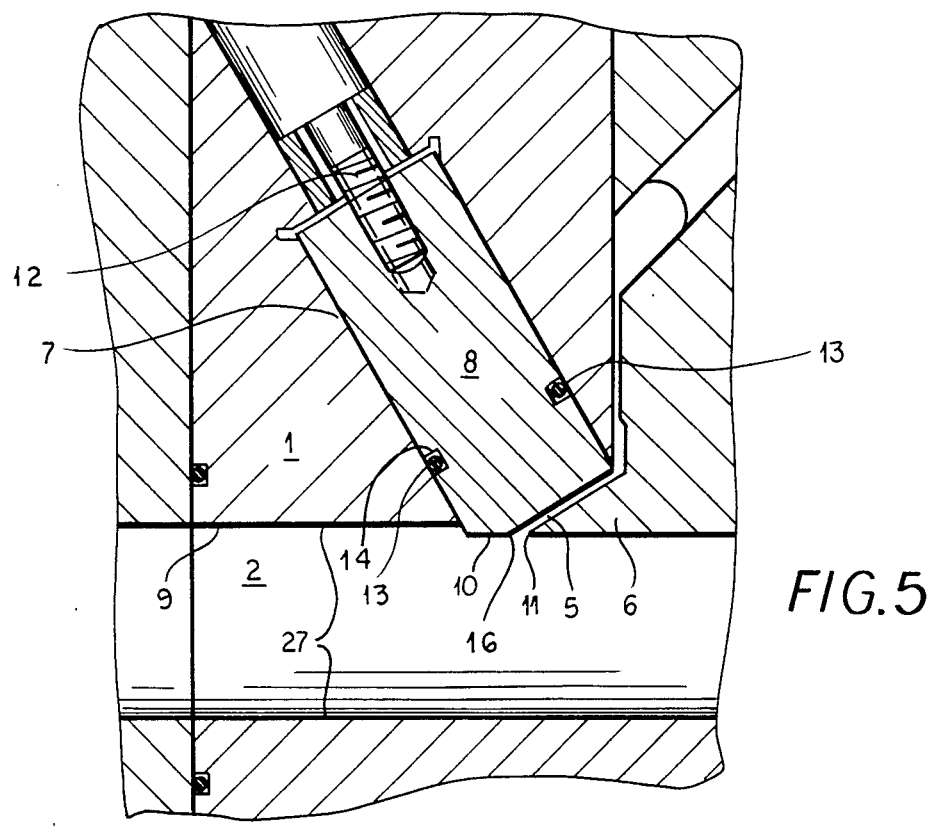
FIG. 5 is an enlarged cross sectional view of the portion V of the apparatus of FIG. 1 indicated by dot-dash lines in FIG. 1.

The combining channel 2 has an essentially rectangular cross section (see FIG. 6) with rounded corners 27. The height of the combining channel 2 is shown in FIGS. 1 and 5, the width in FIG. 6. The combining channel 2 is connected coaxially at one end with the coaxial connecting canal 4 for the already mentioned first extruder screw press 23 and at its other end to the transition unit.

Downstream of the connecting canal 4 an input metering slot 5 in this preferred embodiment connects a second canal 15 originating from an additional extrusion screw press 24 with an adjusting bar recess 7, in which an essentially rectangular adjusting bar 8 is guided.

The input metering slot 5 extends over a long rectangle side of the rectangular combining channel 2 and opens into it, and runs further slantedly in the downstream direction into the combining channel 2. The adjusting bar 8 has a compensating beveled edge 10 designed to equalize flow across the combining channel cross section. It is perpendicular to the tongue 6 defining the bottom of the input metering slot 5 and adjustable and movable in the adjusting bar recess 7.

Figure 2:
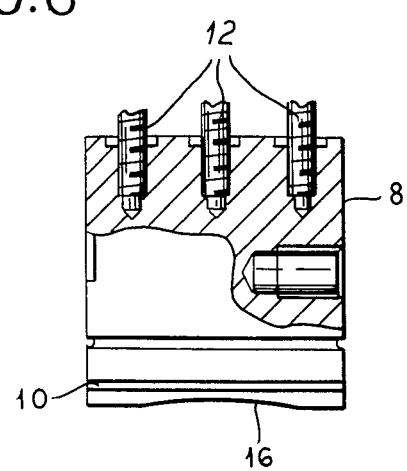
FIG. 2 is an enlarged partially sectional view of the adjusting bar taken in the direction of arrow II in FIG. 1.
Figure 3:
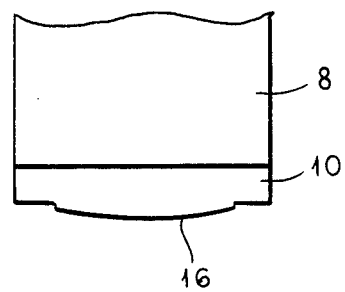
FIGS. 3 and 4 are partial elevational views of different embodiments of the adjusting bar seen in a direction opposite to the direction II.
Figure 4:
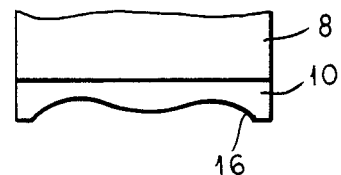

In order to attain an overall equal layer thickness reliably, it is recommended that the profile 16 of the adjusting bar 8 for the input metering slot 5 to concave as in FIG. 2, convex as in FIG. 3, or sinusoidal as in FIG. 4. It is understood that the combining channel 2 has a greater cross section below the mouth 11 of the input metering slot 5, so that the partial flow, which will be input by the input metering slot 5, can be received as a covering layer.

The adjusting bar 8 projects with its compensating beveled edge 10 down into the combining channel 2. The input metering slot 5 extends in this preferred embodiment along the full width of the rectangular side 9 of combining channel 2 and opens into it. It is adjusted very exactly with the aid of the adjusting screw 12. FIG. 5 also shows sealing groove 13, in which the sealing means 14 are installed, which bear against the wall of the adjusting bar recess 7. Perpendicular to the plane of the drawing after removal of the adjusting screw 12, the adjusting bar 8 can be withdrawn from the adjusting bar recess 7 and another exchanged for it.

Insulation is provided at 28 around the block 1 which can be heated by a heating fluid traversing passages 29. A row with a plurality of adjusting screws 12 may be distributed along the length of adjusting bar 8 as seen in FIG. 2. In a further embodiment, a plurality of adjusting bars may be provided having different adjustable beveled portions.

We claim:

1. In an apparatus for continuous extrusion of a plastic laminate comprising at least two extrusion screw presses, an accumulator block, a transition unit, and an output die from which a plastic laminate is extruded, wherein the accumulator block has a combining channel, to which said extrusion screw presses are connected and which is connected to said output die by way of said transition unit, the improvement wherein said combining channel has an essentially rectangular cross section with rounded corners, said combining channel being connected at a first end coaxially to a connecting canal with one of said extrusion screw presses and at a second end opposite said first end of said combining channel to said transition unit, said combining channel having downstream of said connecting canal at least one input metering slot connected to said combining channel at a first end of said slot and at a second end of said slot to another of said extrusion screw presses, said input metering slot being positioned between an input tongue formed on a wall of said combining channel and a substantially rectangular cross section adjusting bar recess formed in said block, said adjusting bar recess having a rectangular adjusting bar therein, said input slot extending over a long side of said combining channel, said input metering slot being slanted toward said channel in a downstream direction, and said adjusting bar having a compensating beveled portion for compensating flow across the width of said combining channel and being adjustable in said adjusting bar recess perpendicularly to said slot, said beveled portion being downstream from said slot and being an extension of a surface of said combining channel wall forming said input tongue.

2. The improvement according to claim 1 wherein said input metering slot extends over the entire breadth of said rectangular side of said combining channel and opens directly into said combining channel.

3. The improvement according to claim 1 wherein said adjusting bar is provided with an adjusting screw for precisely positioning it relative to said tongue.

4. The improvement according to claim 1 wherein a plurality of adjusting screws are distributed along the length of said adjusting bar.

5. The improvement according to claim 1 wherein said adjusting bar has as viewed through said input metering slot a convex profile.

6. The improvement according to claim 1 wherein said adjusting bar as viewed through said input metering slot has a concave profile.

7. The improvement according to claim 1 wherein said adjusting bar has as viewed through said input metering slot a sinusoidal profile.

8. The improvement according to claim 1 wherein a plurality of exchangeable adjusting bars are provided having different adjustable beveled portions.

* * * * *